(12) United States Patent
Nishimura et al.

(10) Patent No.: US 6,940,250 B2
(45) Date of Patent: Sep. 6, 2005

(54) SYNCHRONOUS MOTOR CONTROL DEVICE AND METHOD OF CORRECTING DEVIATION IN ROTATIONAL POSITION OF SYNCHRONOUS MOTOR

(75) Inventors: Shinji Nishimura, Tokyo (JP); Masakazu Nakayama, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/784,964

(22) Filed: Feb. 25, 2004

(65) Prior Publication Data

US 2005/0104551 A1    May 19, 2005

(30) Foreign Application Priority Data

Feb. 28, 2003  (JP) ............................. 2003-054472

(51) Int. Cl.[7] .............................. H02P 7/36; H02P 3/18; H02P 5/28; H02P 7/04
(52) U.S. Cl. ...................... 318/705; 318/706; 318/710; 318/716; 318/721; 318/138; 318/254; 318/439; 318/432; 318/700; 318/800; 318/802; 318/805; 318/806
(58) Field of Search ................. 310/162; 318/254, 318/138, 700–706, 721, 716–719, 710, 432, 318/720, 722–3, 724

(56) References Cited

U.S. PATENT DOCUMENTS

| 4,724,373 A | * | 2/1988 | Lipo ........................... 318/805 |
| 4,808,903 A | * | 2/1989 | Matsui et al. ................ 318/800 |
| 5,729,102 A | * | 3/1998 | Gotou et al. ................. 318/254 |
| 6,069,467 A | * | 5/2000 | Jansen ......................... 318/802 |
| 6,518,722 B1 | * | 2/2003 | Giuseppe ..................... 318/727 |
| 6,788,024 B2 | * | 9/2004 | Kaneko et al. ............. 318/807 |
| 6,838,844 B2 | * | 1/2005 | Shimizu et al. ............. 318/287 |
| 6,861,813 B2 | * | 3/2005 | Yoshimoto et al. ......... 318/432 |

FOREIGN PATENT DOCUMENTS

| JP | 06-165561 A | 6/1994 |
| JP | 2001-128484 A | 5/2001 |
| JP | 2001-204190 A | 7/2001 |

* cited by examiner

*Primary Examiner*—David Martin
*Assistant Examiner*—Elias B. Hiruy
(74) *Attorney, Agent, or Firm*—Sughrue Mion, PLLC

(57) ABSTRACT

In a synchronous motor control device that corrects a deviation in rotational position which is related to a rotational position detector for a synchronous motor on which vector-control is performed, the synchronous motor control device includes: a current instruction generator that disables a torque instruction to set d-axis and q-axis current instructions as zero when a phase correction instruction is inputted; a current controller that outputs d-axis and q-axis voltage instructions based on the d-axis and q-axis current instructions; a phase correction quantity detector for determining the amount of offset in which the d-axis voltage instruction becomes zero when the phase correction instruction is inputted and the d-axis voltage instruction is not zero; an adder for adding a rotor positional angle and the amount of offset; and a voltage converter for determining three-phase voltage instructions based on the additional value, the d-axis and q-axis voltage instructions.

10 Claims, 4 Drawing Sheets

SYNCHRONOUS MOTOR CONTROL DEVICE AND METHOD OF CORRECTING DEVIATION IN ROTATIONAL POSITION OF SYNCHRONOUS MOTOR

BACKGROUND OF THE INVENTION

1. Field of the Invention

The present invention relates to a synchronous motor control device for correcting a deviation in rotational position of a synchronous motor, and also to a method of correcting the deviation in rotational position of the synchronous motor using the control device.

2. Description of the Related Art

A conventional method of correcting a deviation caused between a motor rotational position determined from an output of a rotational position detector and an actual motor rotational position includes: a step of detecting a no-load state of a motor by an unloading detector; a step of detecting a motor voltage applied to the windings of a motor by a motor voltage detector; a step of computing d-axis and q-axis voltages from rotational angular information of the rotational position detector and the motor voltage; and a step of correcting a rotational angle such that the d-axis voltage becomes zero (for example, see JP 06-165561 A).

Also, another method includes: a step of supplying predetermined DC currents to coils of a three-phase synchronous motor; a step of detecting a rotational position of the three-phase synchronous motor stopped at a theoretical rotational position by supplying the predetermined currents; a step of determining as a correction value a deviation between the detected rotational position of the motor and a preset theoretical rotational position; and a step of correcting the detected rotational position of the motor based on the correction value (for example, see JP 2001-128484 A).

Further, another method includes: a step of setting an instruction torque current as zero and inputting an instruction magnetic flux current of an arbitrary finite repetition waveform to a motor; a step of computing an angular acceleration from a detection rate; a step of estimating a torque produced from a motor from the instruction magnetic flux current, the angular acceleration, inertia of the motor, viscous friction of the motor, and friction torque of the motor using a motor motion equation; a step of estimating a torque current by dividing the estimated torque by a torque constant of the motor; a step of estimating a magnetic flux current using the instruction magnetic flux current and the estimated torque current; and a step of estimating an initial magnetic polar position using the estimated magnetic flux current and the estimated torque current (for example, see JP 2001-204190 A).

In the case of using the conventional method of correcting the deviation caused between the rotational position of the synchronous motor which is determined from the output of the rotational position detector and the actual rotational position of the synchronous motor, it is necessary to provide the motor voltage detector and the unloading detector. Therefore, an apparatus to which this method is applied becomes expensive.

Also, in the conventional method, it is expected to stop a rotor at a predetermined position by supplying a DC current. Therefore, in a state in which a load such as an internal combustion engine is connected with the rotor, there is a fear that the rotor stops at a position deviated from the predetermined position by the frictional force of the load, so that the deviation in rotational position cannot be precisely corrected.

Also, in the conventional method, the torque current Iq is set as zero and the amount of deviation in rotational position is estimated from a change in rotational rate when a magnetizing current Id is changed. Therefore, when the load is connected with the rotor, the precise position correction cannot be performed because of a variation in rotational rate resulting from the load.

SUMMARY OF THE INVENTION

An object of the present invention is to provide a synchronous motor control device capable of precisely correcting a deviation in rotational position related to a rotational position detector even in a state in which a load is connected with a rotor without using an unloading detector and a motor voltage detector, and to provide a method of correcting the deviation in rotational position using the device.

Bearing the above object in mind, the present invention resides in a synchronous motor control device which is constructed as follows. That is, a rotational position detector detects a rotational position of a synchronous motor. An angular rate computing unit determines a rotational angular rate from the rotational position. A current instruction generator determines a d-axis current instruction and a q-axis current instruction from the rotational angular rate and a torque instruction. A three-phase to two-phase converter converts three-phase currents flowing into the synchronous motor into a d-axis current and a q-axis current. A current controller determines a d-axis voltage instruction and a q-axis voltage instruction from a difference between the d-axis current instruction and the d-axis current and a difference between the q-axis current instruction and the q-axis current. A phase computing unit determines a rotor positional angle from an output from the rotational position detector. A voltage converter determines three-phase voltage instructions based on the rotor positional angle, the d-axis voltage instruction, and the q-axis voltage instruction. A phase correction quantity detector determines the amount of offset in which the d-axis voltage instruction becomes zero when the phase correction instruction is inputted and the d-axis voltage instruction is not zero, and turns off phase correction instruction when the phase correction instruction is inputted and the d-axis voltage instruction is zero. An adder adds the amount of offset to the rotor positional angle to determine a fresh rotor positional angle, and outputs the fresh rotor positional angle to the voltage converter.

Also, when the phase correction instruction is inputted, the current instruction generator sets the d-axis current instruction and the q-axis current instruction as zero. The current controller determines the d-axis voltage instruction and the q-axis voltage instruction from the difference between the d-axis current instruction which is set as zero and the d-axis current, and the difference between the q-axis current instruction which is set as zero and the q-axis current. The phase correction quantity detector determines the amount of offset in which the d-axis voltage instruction becomes zero when the d-axis voltage instruction is not zero. The adder adds the rotor positional angle and the amount of offset to determine the fresh rotor positional angle in which the d-axis voltage instruction becomes zero, thereby corrects a deviation produced between the rotational position of the synchronous motor which is determined from the output from the rotational position detector and an actual rotational position of the synchronous motor.

Further, according to the present invention, there is a rotational position deviation correcting method of correcting a deviation produced between a rotational position of a synchronous motor which is determined from an output of a rotational position detector for the synchronous motor on which vector control is performed and an actual rotational position of the synchronous motor. The method comprises inputting a phase correction instruction for instructing correction of the deviation in rotational position when the deviation in rotational position is corrected, disabling a torque instruction to set a d-axis current instruction and a q-axis current instruction as zero, converting three-phase current values of the synchronous motor into a d-axis current and a q-axis current, determining a difference between the d-axis current instruction and the d-axis current and a difference between the q-axis current instruction and the q-axis current, determining a d-axis voltage instruction and a q-axis voltage instruction based on the differences, judging whether or not the determined d-axis voltage instruction is zero, determining the amount of offset in which the d-axis voltage instruction becomes zero when the d-axis voltage instruction is not zero, turning off the phase correction instruction when the d-axis voltage instruction is zero, adding a rotor positional angle determined by integrating the output of the rotational position detector and the amount of offset to determine an additional value, and determining three-phase voltage instructions to be supplied to an inverter based on the additional value, the d-axis voltage instruction, and the q-axis voltage instruction.

Accordingly, it is possible to precisely correct a deviation in rotational position related to a rotational position detector even in a state in which a load is connected with a rotor without using an unloading detector and a motor voltage detector.

DETAILED DESCRIPTION OF THE PREFERRED EMBODIMENTS

Embodiment 1

Figure 1:
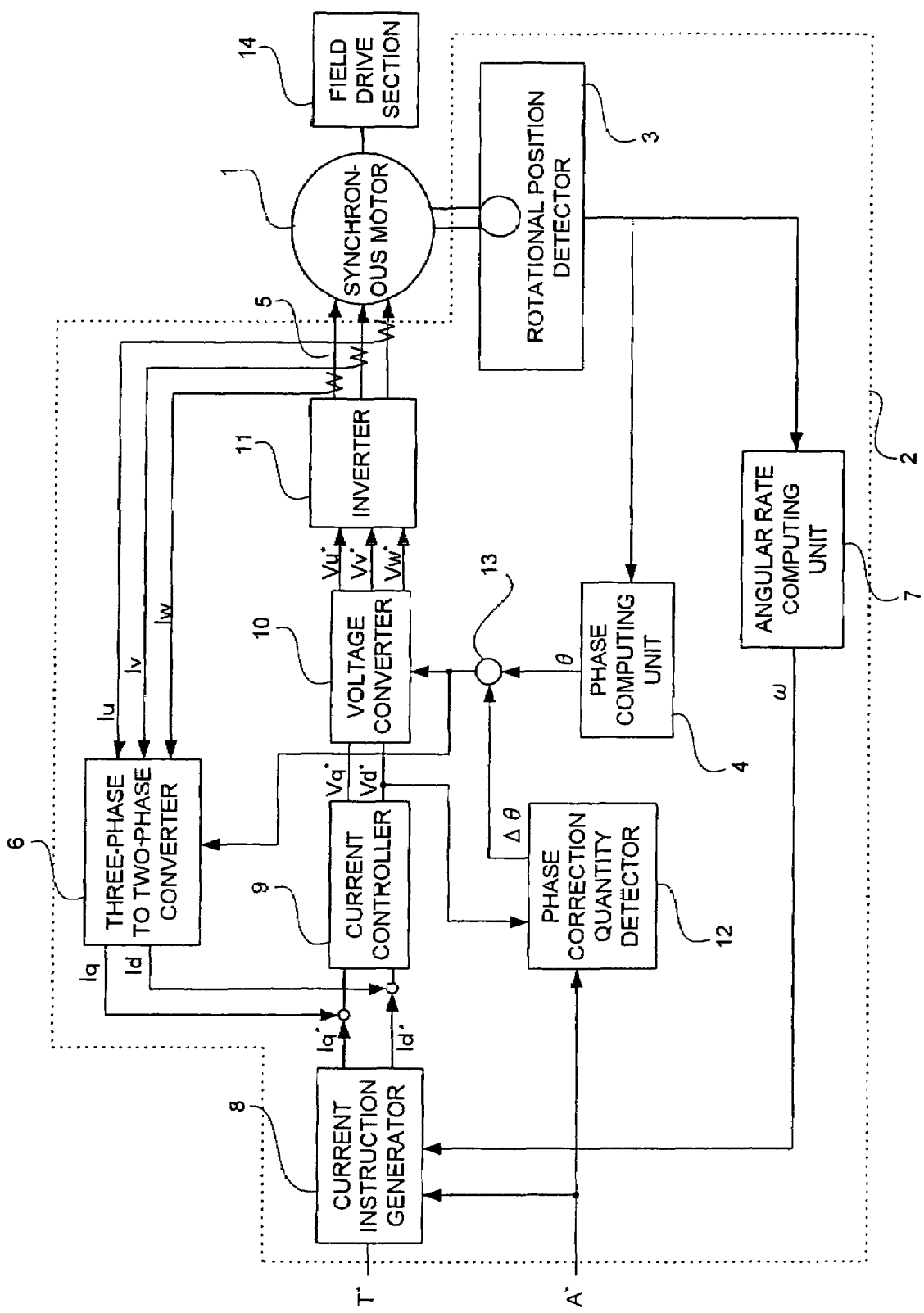
FIG. 1 is a block diagram showing a synchronous motor control device according to Embodiment 1 of the present invention.

FIG. 1 is a block diagram showing a synchronous motor control device according to Embodiment 1 of the present invention.

The synchronous motor control device includes a synchronous motor 1 having a permanent magnet field or a winding field and a control device 2 for controlling a synchronous motor. The control device 2 includes: a rotational position detector 3 which is composed of a resolver and detects a rotor position of the synchronous motor 1; a phase computing unit 4 for computing a rotor positional angle θ from an output of the rotational position detector 3; a current detector 5 for detecting three-phase currents Iu, Iv, and Iw of the synchronous motor 1; a three-phase to two-phase converter 6 for converting the rotor positional angle θ and the three-phase currents Iu, Iv, and Iw into d-axis and q-axis actual currents Id and Iq; an angular rate computing unit 7 for computing a rotational angular rate ω of the synchronous motor 1 from the output of the rotational position detector 3; a current instruction generator 8 for generating a d-axis current instruction Id* and a q-axis current instruction Iq* from a torque instruction T* and the rotational angular rate ω; a current controller 9 for determining a d-axis voltage instruction Vd* and a q-axis voltage instruction Vq* from an error Δed between the d-axis current instruction Id* and the d-axis actual current Id and an error Δeq between the q-axis current instruction Iq* and the q-axis actual current Iq; a voltage converter 10 for determining three-phase voltage instructions Vu*, Vv*, and Vw* from the d-axis voltage instruction Vd*, the q-axis voltage instruction Vq*, and the rotor positional angle θ; an inverter 11 for converting power of a DC power source (not shown) into three-phase AC powers based on the three-phase voltage instructions Vu*, Vv*, and Vw* to supply the powers to the synchronous motor 1; a phase correction quantity detector 12 for receiving the d-axis voltage instruction Vd* and determining the amount of offset Δθ related to the rotor positional angle θ; and an adder 13 for adding the amount of offset Δθ to the rotor positional angle θ from the phase computing unit 4.

Further, a field drive section 14 for exciting field windings is provided to the synchronous motor 1.

The synchronous motor control device 2 has the same structure as conventional synchronous motor control devices or permanent magnet field synchronous motor control devices (DC brushless motor) to which vector control is applied, except the phase correction quantity detector 12. Therefore, the operations of the same parts will be briefly described.

The rotor positional angle θ of the motor 1 is determined from the output of the resolver, which is the rotational position detector 3 by the phase computing unit 4. The rotational angular rate ω is determined using the output of the resolver by the angular rate computing unit 7. The rotational angular rate ω and the torque instruction T* are inputted to the current instruction generator 8. The d-axis current instruction Id* and the q-axis current instruction Iq* are determined such that a torque T at the rotational angular rate ω becomes the torque instruction T*. On the other hand, the three-phase currents Iu, Iv, and Iw flowing into the motor 1 are detected by the current detector 5. The d-axis actual current Id and the q-axis actual current Iq are determined from the rotor positional angle θ and the three-phase currents Iu, Iv, and Iw by the three-phase to two-phase converter 6. In the current controller 9, proportional plus integral control (so-called PI control) is performed on the error Δed between the d-axis current instruction Id* and the d-axis actual current Id and the error Δeq between the q-axis current instruction Iq* and the q-axis actual current Iq, and then decoupling control in which terms coupled with each other are subtracted is performed to determine the d-axis voltage instruction Vd* and the q-axis voltage instruction Vq*. The three-phase voltage instructions Vu*, Vv*, and Vw* are determined based on these voltage instructions Vd* and Vq* and the rotor positional angle θ by the voltage converter 10. A current output is controlled based on the three-phase voltage instructions Vu*, Vv*, and Vw* by the inverter 11, so that the rotational rate and the torque of the motor 1 are controlled. Thus, the vector control of the synchronous motor 1 is performed. A field current instruction If* is inputted to the field drive section 14 to flow a predetermined current to the field windings.

In the above-mentioned vector control, when a mount position of the resolver mounted to the synchronous motor 1 is deviated in a rotational direction, the rotor positional angle θ determined from the output of the resolver is deviated from an angle related to an actual position of the rotor of the synchronous motor 1, so that the three-phase currents are not accurately converted into the d-axis and q-axis currents. Therefore, the normal vector control cannot be performed.

To describe it in more detail, voltage equations of the synchronous motor in the d-axis and the q-axis can be indicated by Expressions (1) and (2).

$$Vd=RId-\omega LqIq \quad (1)$$

$$Vq=RIq+\omega LdId+\omega \Psi f \quad (2)$$

Here, Vd denotes the d-axis voltage, Vq denotes the q-axis voltage, R denotes a resistance value of a phase, Id denotes the d-axis current, Iq denotes the q-axis current, Ld denotes a d-axis inductance, Lq denotes a q-axis inductance, ω denotes the rotational angular rate, and Ψf denotes a magnetic flux in the permanent magnet field or the winding field.

In the above-mentioned Expressions (1) and (2), if Id=0 and Iq=0, Vd=0 and Vq=ωΨf are determined.

However, when a deviation δ is produced between the rotational position of the motor which is determined from the output of the rotational position detector 3 and the actual rotational position of the motor, Vd and Vq become ωΨfsinδ and ωΨfcosδ, respectively, so that VD does not become zero. Therefore, it is necessary to correct the deviation produced between the rotational position of the motor which is determined from the output of the rotational position detector 3 and the actual rotational position of the motor.

Next, a rotational position deviation correcting method of correcting a deviation in rotational position of the synchronous motor, which is concerned with the rotational position detector 3, according to the present invention will be described.

The rotational position deviation correcting method includes: a step of instructing a phase correction A*, so that the torque instruction T* is disabled to set the d-axis current instruction Id* and the q-axis current instruction Iq* as zero; a step of determining the d-axis voltage instruction Vd* and the q-axis voltage instruction Vq* such that the d-axis actual current Id and the q-axis actual current Iq are set as zero; a step of determining the amount of offset Δθ in which the d-axis voltage instruction Vd* becomes zero when the determined d-axis voltage instruction Vd* is not zero; a step of adding the rotor positional angle θ determined by integrating the output of the rotational position detector 3 and the amount of offset Δθ; and a step of determining the three-phase voltage instructions Vu*, Vv*, and Vw* to be supplied to the inverter 11 based on an additional value (θ+ Δθ), the d-axis voltage instruction Vd*, and the q-axis voltage instruction Vq*.

The step of determining the amount of offset Δθ will be described in more detail. When the output Vd* of the current controller 9 is not zero, the amount of offset Δθ is determined. When Vd* is positive, the amount of offset Δθ is set to +Δθ. When Vd* is negative, the amount of offset Δθ is set to −Δθ. The amount of offset Δθ is successively determined from of the arithmetic progression of angles (1°, 2°, ..., n°) and outputted to the adder 13. Thus, Δθ is changed until Vd* becomes zero.

A value determined by subtracting a half of difference from the amount of offset Δθ when Vd* approaches zero and a sign of Vd* is reversed is outputted as the amount of offset Δθ. In the case of the above-mentioned arithmetic progression, (Δθ−0.5°) is used as the amount of offset Δθ. Thus, Vd* is converged on zero. After Vd* is converged on zero as described above, the phase correction instruction is turned off to return to the general vector control of the synchronous motor.

According to such a synchronous motor control device, a judgment is made as to whether or not the d-axis voltage instruction Vd* which is already determined in the synchronous motor control device is zero. When it is not zero, a deviation in rotational position can be corrected by adding the amount of offset to a phase or by subtracting the amount of offset from the phase.

In general, the computing of Vd*, the outputting of the current instructions Id* and Iq*, the computing of the rotor angle, and the like are realized by software. Therefore, the deviation in rotational position can be corrected by only minor changes of the software, so that the deviation can be corrected by an inexpensive synchronous motor control device without providing the voltage detector or the like which is used for the conventional method.

During the deviation correction, the motor is controlled to be Id*=0 and Iq*=0, so that a current hardly flows into the synchronous motor. Therefore, even when the rotational position detector is mounted at a random position, an unexpected current hardly flows into the synchronous motor and the inverter, so that a torque is hardly produced in the synchronous motor. Thus, abnormal operation such as rapid acceleration/deceleration to a device connected with the synchronous motor, for example, an internal combustion engine is not caused.

Note that the resolver is used as the rotational position detector. Another rotational position detector such as an encoder may be used.

The output of the resolver is separately inputted to the phase computing unit 4 and the angular rate computing unit 7 for the sake of a simple explanation. It may be inputted to a phase detector (R/D converter or the like) to simultaneously determine an angular rate. Alternatively, angular information may be time-differentiated (differenced) to compute the angular rate.

Embodiment 2

Figure 2:
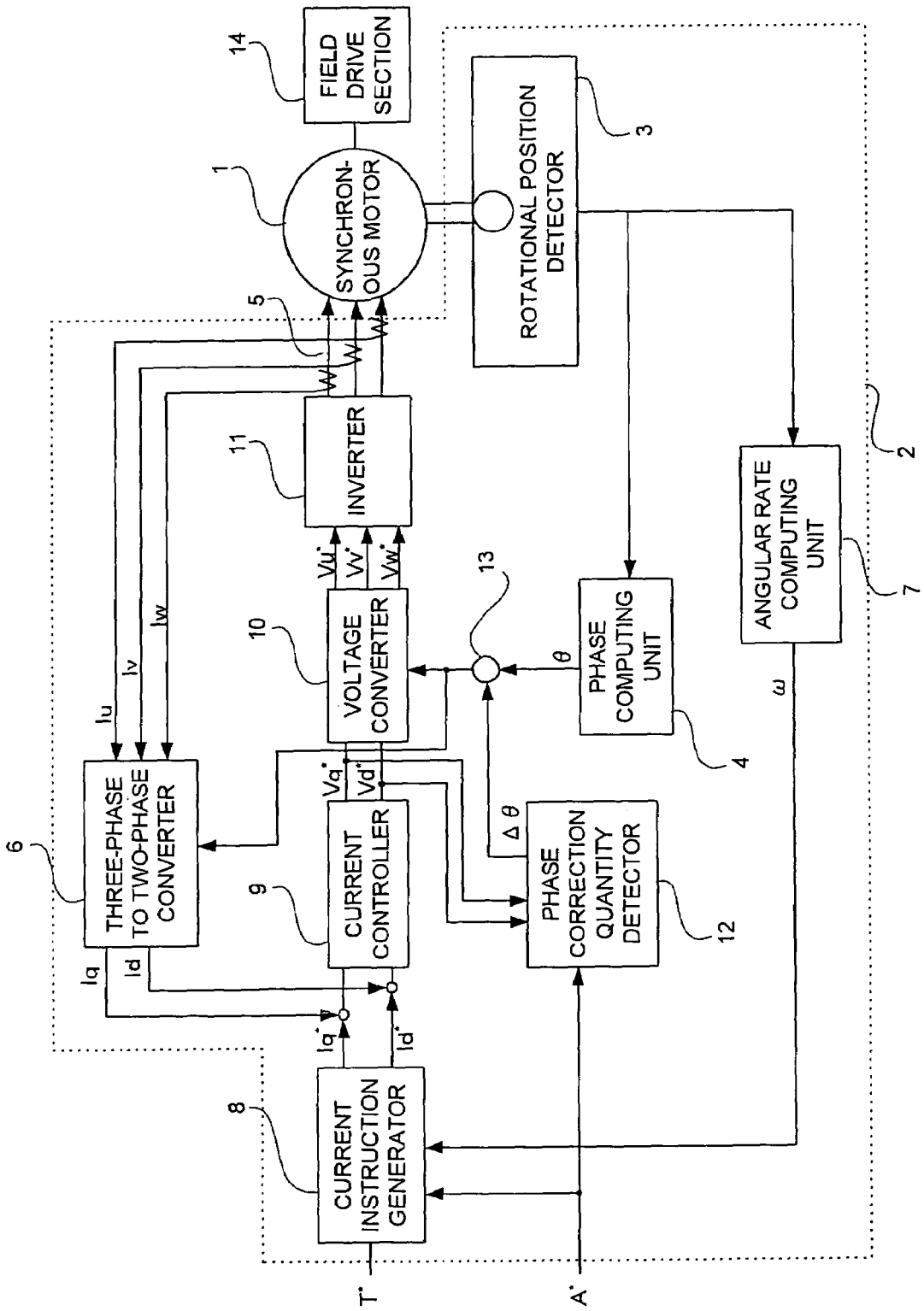
FIG. 2 is a block diagram showing a synchronous motor control device according to Embodiment 2 of the present invention.

FIG. 2 is a block diagram showing a synchronous motor control device according to Embodiment 2 of the present invention. In FIG. 2, a phase correction quantity detector is different from that in the synchronous motor control device shown in FIG. 1 and the other parts are the same. The description of the same parts is omitted here.

The voltage instructions Vd* and Vq* which are the outputs of the current controller 9 are inputted to a phase correction quantity detector 12a.

The phase correction quantity detector 12a determines the deviation δ by calculating an inverse tangent (arc tangent) of the voltage instructions Vd* and Vq*. The deviation δ is directly outputted as the amount of offset Δθ to the adder 13.

According to such a synchronous motor control device, the deviation δ can be directly determined, so that the length of time necessary to correct the deviation is shortened.

Embodiment 3

In the phase correction quantity detector 12 of the synchronous motor control device according to Embodiment 3, a method of determining the amount of offset Δθ is different from that in the case of FIG. 1. When Vd* is not zero, an angle of 1° to 180° is scanned as the amount of offset Δθ every 1° to record a value of Vd*. Then, the amount of offset Δθ is determined by interpolation using two amounts of offset in which Vd* is close to zero.

According to such a synchronous motor control device, the amount of offset is scanned at regular intervals and the amount of offset in which Vd* becomes zero is determined by the interpolation, so that the repetition operation is unnecessary and thus the length of time necessary to determine the amount of offset is shortened.

Embodiment 4

Figure 3:
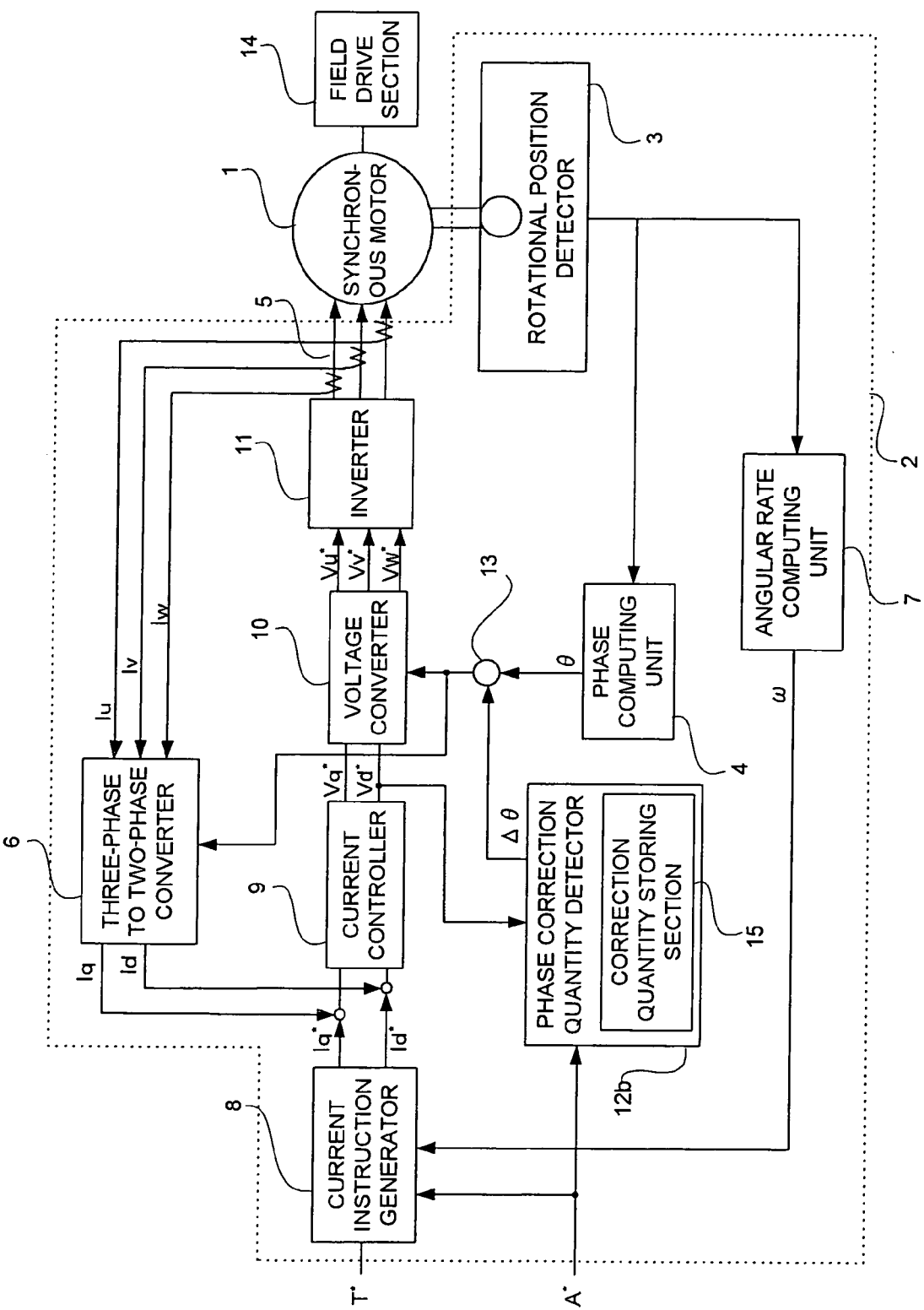
FIG. 3 is a block diagram showing a synchronous motor control device according to Embodiment 4 of the present invention.

FIG. 3 is a block diagram showing a synchronous motor control device according to Embodiment 4 of the present invention. In FIG. 3, a phase correction quantity detector is different from that in FIG. 1 and the other parts are the same. The description of the same parts is omitted here.

A phase correction quantity detector 12b includes a correction quantity storing section 15. The correction quantity storing section 15 is a nonvolatile memory.

The phase correction quantity detector 12b determines the amount of offset Δθ in which Vd* becomes zero by using the same method as in Embodiment 1 and causes the correction quantity storing section 15 to store the determined amount of offset Δθ.

According to such a synchronous motor control device, after a power source is turned on again, when the amount of offset stored in the correction quantity storing section 15 is read and the read amount of offset is used, it is unnecessary to newly correct a deviation because zero correction has been performed.

Note that the correction quantity storing section 15 may be composed of, for example, an SRAM to which very small power is supplied.

Embodiment 5

Figure 4:
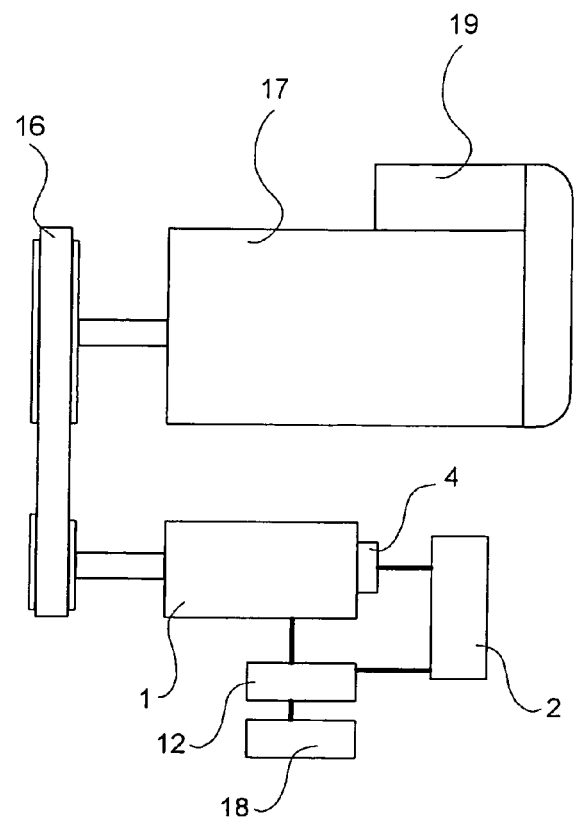
FIG. 4 is a block diagram showing an engine in which a synchronous motor control device according to Embodiment 5 of the present invention is used for an activation device and a charging device.

FIG. 4 is a block diagram showing an engine in which a synchronous motor control device according to Embodiment 5 of the present invention is used for an activation device and a charging device of the internal combustion engine. In FIG. 4, the parts similar to or corresponding to those in FIG. 1 are indicated by the same numerals.

The engine includes an internal combustion engine 17 that transfers a torque to the synchronous motor 1 through a rotational axis thereof and a belt 16, a battery 18 that performs charge and discharge through the inverter 11 of the control device 2, and an activation motor 19 that activates the internal combustion engine 17.

The operation of the engine will be described. When an ignition key which is not shown is turned to an activation position, the internal combustion engine 17 is activated by the activation motor 19. After the completion of the activation, when the phase correction instruction A* is inputted to the control device 2, the current instructions Id* and Iq* become zero, so that a current in the synchronous motor 1 is controlled so as not to flow. At this time, in the case of a winding field type motor, a field current is made to flow. In such a state, when the d-axis voltage instruction Vd* is not zero, the amount of offset Δθ is determined as in Embodiment 1. The voltage converter 10 determines the three-phase voltage instructions Vu*, Vv*, and Vw* using the rotor positional angle θ to which the determined amount of offset Δθ is added and the voltage instructions Vq* and Vd*, and inputs the determined three-phase voltage instructions to the inverter 11. Thus, the deviation produced between the rotational position of the motor which is determined from the output of the rotational position detector 3 and the actual rotational position of the motor can be corrected to zero. The amount of offset is stored and then the phase correction operation is completed to turn off the phase correction instruction. After that, the synchronous motor 1 operates as a charging device of the internal combustion engine 17.

According to such a synchronous motor control device, even in a state in which a load such as the internal combustion engine is connected therewith, the phase correction can be performed without canceling the connection.

Because the synchronous motor is driven by the internal combustion engine, the deviation can be corrected without providing another motor driving mechanism for deviation correction.

When the internal combustion engine 17 is stopped as in the case of an idling stop, the synchronous motor control device in which the deviation correcting operation is completed can act as an activation device that activates the internal combustion engine 17 using a motor. That is, because the positional deviation related to the rotational position detector is corrected by the previous deviation correcting operation, the synchronous motor 1 can accurately activate the internal combustion engine 17.

The correction quantity storing section 15 is backed up by the battery 18 after the ignition key is turned off. Therefore, when the amount of offset Δθ stored in the correction quantity storing section 15 is read out, the synchronous motor 1 can be activated by turning on the ignition key again.

Note that a power source (battery 18) connected with the synchronous motor 1 is not necessarily identical with a power source (battery 18) connected with the activation motor. Therefore, the synchronous motor 1 and the activation motor may be connected with separate batteries 18, or even connected with batteries 18 having different voltages.

Embodiment 6

Figure 5:
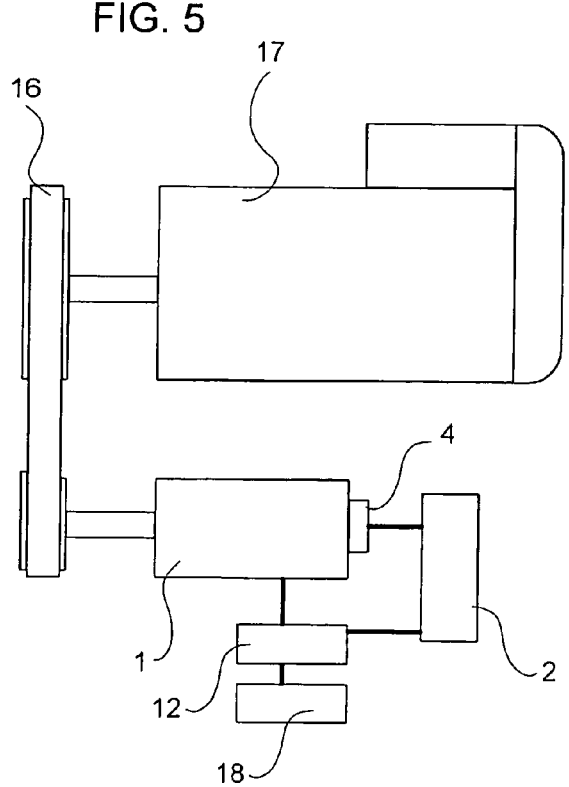
FIG. 5 is a block diagram showing an engine in which a synchronous motor control device according to Embodiment 6 of the present invention is used for an activation device and a charging device.

FIG. 5 is a block diagram showing an engine in which a synchronous motor control device according to Embodiment 6 of the present invention is used for an activation device and a charging device of the internal combustion engine. In FIG. 5, the activation motor shown in FIG. 4 is removed. Others are the same and the description of the same parts is omitted here.

The resolver is mechanically roughly adjusted leaving some rotational position deviation and then the internal combustion engine 17 is activated by the synchronous motor 1. In this case, because there is a fear that the driving force becomes smaller than the generally obtained driving force, it is expected that it takes somewhat longer time to activate the engine. However, once the engine is activated, the deviation correcting operation may be performed to store the amount of offset Δθ.

Such a synchronous motor is slowly activated just one time. However, after that, the internal combustion engine can be activated with a normal state. Thus, the internal combustion engine can be activated without providing an additional activation motor in the internal combustion engine.

What is claimed is:

1. A control device for a synchronous motor, comprising:
   a rotational position detector for detecting a rotational position of a synchronous motor;
   an angular rate computing unit for determining a rotational angular rate from the rotational position;
   a current instruction generator for determining a d-axis current instruction and a q-axis current instruction from the rotational angular rate and a torque instruction;
   a three-phase to two-phase converter for converting three-phase currents flowing into the synchronous motor into a d-axis current and a q-axis current;
   a current controller for determining a d-axis voltage instruction and a q-axis voltage instruction from a difference between the d-axis current instruction and the d-axis current and a difference between the q-axis current instruction and the q-axis current;
   a phase computing unit for determining a rotor positional angle from an output from the rotational position detector;
   a voltage converter for determining three-phase voltage instructions based on the rotor positional angle, the d-axis voltage instruction, and the q-axis voltage instruction;
   a phase correction quantity detector for determining the amount of offset in which the d-axis voltage instruction becomes zero when the phase correction instruction is inputted and the d-axis voltage instruction is not zero, and turning off phase correction instruction when the phase correction instruction is inputted and the d-axis voltage instruction is zero; and
   an adder for adding the amount of offset to the rotor positional angle to determine a fresh rotor positional angle, and outputting the fresh rotor positional angle to the voltage converter,
   wherein, when the phase correction instruction is inputted,
   the current instruction generator sets the d-axis current instruction and the q-axis current instruction as zero;
   the current controller determines the d-axis voltage instruction and the q-axis voltage instruction from the difference between the d-axis current instruction which is set as zero and the d-axis current, and the difference between the q-axis current instruction which is set as zero and the q-axis current;
   the phase correction quantity detector determines the amount of offset in which the d-axis voltage instruction becomes zero when the d-axis voltage instruction is not zero; and
   the adder adds the rotor positional angle and the amount of offset to determine the fresh rotor positional angle in which the d-axis voltage instruction becomes zero, thereby correcting a deviation produced between the rotational position of the synchronous motor which is determined from the output from the rotational position detector and an actual rotational position of the synchronous motor.

2. A control device for a synchronous motor according to claim 1, wherein the phase correction quantity detector determines the amount of offset in which the d-axis voltage instruction becomes zero by successively increasing or decreasing the amount of offset.

3. A control device for a synchronous motor according to claim 1, wherein the phase correction quantity detector determines the amount of offset from the d-axis voltage instruction and the q-axis voltage instruction.

4. A control device for a synchronous motor according to claim 1, wherein the phase correction quantity detector comprises a correction quantity storing section for storing the determined amount of offset, and outputs the stored amount of offset at reactivation of the control device.

5. A control device for a synchronous motor according to claim 1, wherein the synchronous motor is an activation device for an internal combustion engine, and the control device for a synchronous motor corrects the deviation in rotational position after the internal combustion engine is activated by the synchronous motor.

6. A control device for a synchronous motor according to claim 1, wherein
   the synchronous motor is an activation device for the internal combustion engine in which an additional activation motor is provided,
   and first activation is performed on the internal combustion engine by the activation motor,
   the control device for a synchronous motor correcting the deviation in rotational position while the internal combustion engine is activated or the internal combustion engine is operated.

7. A rotational position deviation correcting method of correcting a deviation produced between a rotational position of a synchronous motor which is determined from an output of a rotational position detector for the synchronous motor on which vector control is performed and an actual rotational position of the synchronous motor, the method comprising:
   inputting a phase correction instruction for instructing correction of the deviation in rotational position when the deviation in rotational position is corrected;
   disabling a torque instruction to set a d-axis current instruction and a q-axis current instruction as zero;
   converting three-phase current values of the synchronous motor into a d-axis current and a q-axis current;
   determining a difference between the d-axis current instruction and the d-axis current and a difference between the q-axis current instruction and the q-axis current;
   determining a d-axis voltage instruction and a q-axis voltage instruction based on the differences;
   judging whether or not the determined d-axis voltage instruction is zero, determining the amount of offset in which the d-axis voltage instruction becomes zero when the d-axis voltage instruction is not zero, and turning off the phase correction instruction when the d-axis voltage instruction is zero;
   adding a rotor positional angle determined by integrating the output of the rotational position detector and the amount of offset to determine an additional value; and
   determining three-phase voltage instructions to be supplied to an inverter based on the additional value, the d-axis voltage instruction, and the q-axis voltage instruction.

8. A rotational position deviation correcting method according to claim 7, wherein determining the amount of offset includes determining the amount of offset in which the d-axis voltage instruction becomes zero by successively increasing or decreasing the amount of offset.

9. A rotational position deviation correcting method according to claim 7, wherein determining the amount of offset includes determining the amount of offset from the d-axis voltage instruction and the q-axis voltage instruction.

10. A rotational position deviation correcting method according to claim 7, wherein determining the amount of offset includes storing the determined amount of offset and outputting the stored amount of offset at reactivation of the synchronous motor.

* * * * *